Feb. 15, 1927. 1,617,319
T. V. BUCKWALTER
ROLLER BEARING AND METHOD OF ASSEMBLING THE SAME
Filed Jan. 17, 1925
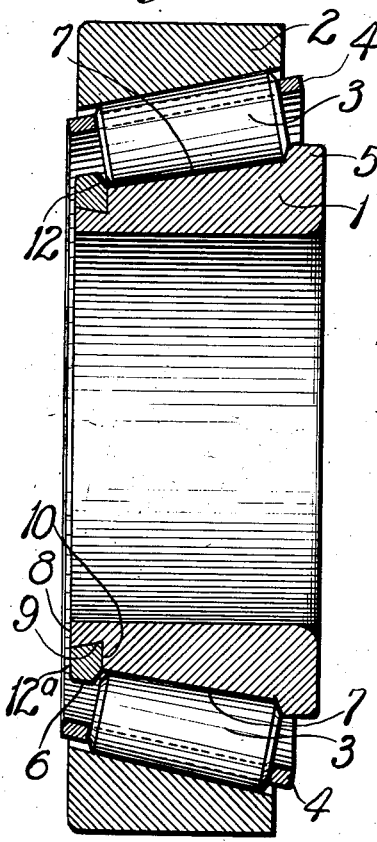
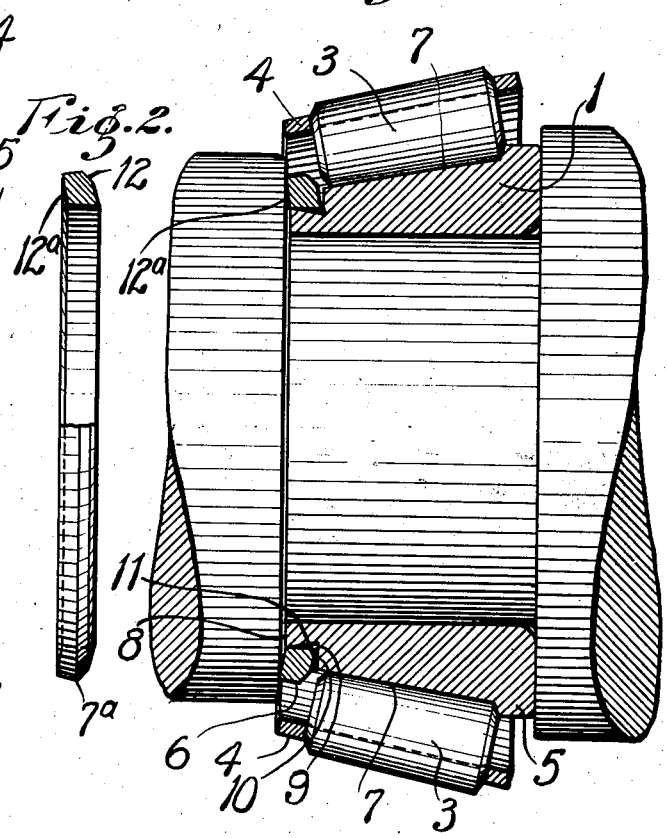
INVENTOR:
Tracy V. Buckwalter
HIS ATTORNEYS.

Patented Feb. 15, 1927.

1,617,319

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

ROLLER BEARING AND METHOD OF ASSEMBLING THE SAME.

Application filed January 17, 1925. Serial No. 3,018.

A common type of roller bearing comprises a cone or inner bearing member whose raceway is bounded on each side by an annular rib, and whose rollers are spaced apart in a circular series and guided by suitable cages. The usual practice, in assembling the parts of such a bearing, requires the bridges of the cages to be bowed outwardly or the end of the cage to be expanded sufficiently to permit the rib at the smaller end of the cone to be forced between the smaller ends of the rollers, whereupon such bridges are straightened or the annular end of the cage contracted to retain the rollers in operative relation to their raceway. The bowing of the bridges and the expansion of the annular end of the cage are liable to produce a permanent set of the metal with the result that the bridges do not fit the rollers with the precision they possessed prior to the assembling of the bearing.

The principal objects of the present invention are to avoid the necessity for disturbing the shape of the cage in the operation of assembling the bearing; also to produce a bearing that will be less exacting in its requirements as to the qualities of the metal used in the cage, and which will also be especially adapted for bearings of large size. The invention consists in the construction and arrangement of parts hereinafter described and claimed and also in the method of assembling parts hereinafter described and claimed.

In the accompanying drawing wherein like numerals refer to like parts wherever they occur, Fig. 1 is a longitudinal cross section of a roller bearing conforming to my invention;

Fig. 2 is a detail view of a ring blank prior to mounting on the bearing cone;

Fig. 3 is a longitudinal sectional view illustrating the operation of mounting the ring blank on the bearing cone;

Fig. 4 is a detail view of a modified form of ring blank; and

Fig. 5 is a detail view of a bearing cone embodying such ring blank.

The present bearing comprises an inner bearing member or cone 1, an outer bearing member or cup 2, conical rollers 3 interposed between said cone and cup in a circular series, and a cage 4, of suitable type, having pockets to receive said rollers. The cone has an annular thrust rib 5 at its larger end integral with the body thereof. At its smaller end, the cone has an annular rib 6, said ribs 5 and 6 projecting radially beyond the raceway or conical bearing surface 7.

According to the present invention, the rib 6 at the smaller end of the cone is a separate piece from the body thereof and is preferably made from a cupped ring blank 7a whose bore is substantially cylindrical. In order to receive this ring blank, the smaller end of the cone is reduced to substantially the same diameter as the bore of the ring, and this reduced end portion 8 has a circumferential groove or undercut 9 whose bottom tapers inwardly from the endmost portion of the reduced end to the shoulder 10 or offset formed by reducing such end.

In order to mount the ring blank, it is slipped over the reduced end 8 of the cone with its concave face outermost, and then the cone with the ring blank thereon is subjected to the action of a ram or plunger endwise thereof. The bearing face of the ram is a plane surface, or otherwise designed, so that its initial contact with the ring blank is near the outer periphery of said blank. The ram first presses the ring blank against the shoulder of the cone, the initial line of contact between the ring blank and said shoulder being at the innermost diameter of said ring blank. In this position, there is a closed annular space between the reduced end portion of the bearing cone and the ring blank corresponding to the groove 9, said space being bounded by the cylindrical inner wall of the ring blank, the inwardly tapering bottom of said groove or outer wall of the reduced end of the bearing cone and by the shoulder 10 of said bearing cone. There is also an annular space 11 between the shoulder of the bearing cone and the convex face of the ring blank, which space is open at the outer diameter of the bearing cone. With the parts in the position stated, the movement of the ram tends to flatten the ring blank, that is, to convert its convex and concave faces into plane surfaces perpendicular to the axis of the cone, and thereby cause the ring to contact with the entire area of the end shoulder of said bearing cone. In producing this effect, the ram causes considerable internal work to be done in said ring blank, resulting in the filling up of the annular space or groove 9 as well as the annular space 11. It is noted that in this operation, the bore of the ring has contracted proportionately to the distance from the concave side of the ring blank. While this result involves some plastic flow of the metal, it is believed that the main movement is in the nature of a pivotal movement longitudinally of the axis of the bearing and around the endmost periphery of the extension of the cone as a fulcrum, whereby the amount of internal work in the metal itself is reduced to a minimum.

In consequence of the operation above described, the ring blank has become firmly interlocked with the reduced end portion of the bearing cone and constitutes a rib for retaining the rollers and resisting end thrust. It is noted that although the ring blank undergoes considerable change of form in the operation of mounting it upon the bearing cone, the cross-sectional shape of the outer marginal portion of the convex face of the ring blank undergoes practically no change, but only a shifting of position. Consequently, it is practicable to finish this portion of the ring blank to the design required of the rib in the finished bearing cone. In practice, the inner face 12 of the rib is beveled or inclined with relation to the axis of the cone; and to produce this condition by the present process, the outer portion 12ª of the convex face of the ring blank is beveled off at substantially the same angle with relation to the inner portion of said face that said portions are required to have in the finished bearing cone.

In assembling the bearing, the rollers, with their cage, are brought into proper relation with the bearing cone before applying the ring blank thereto. The ring blank is then applied and mounted on the end of the cone as hereinbefore described, thereby becoming a part of the bearing cone and functioning to retain the rollers and take end thrust thereof. It is noted that in this method of assembling the parts, the cage undergoes no distortion or work of any kind but remains exactly as made.

In the construction illustrated in Figures 4 and 5, the small end of the cone 15 is coterminous with the race-way 16 thereof, and said end is counterbored, the counterbore increasing in diameter from the end of the cone inwardly and terminating in an annular shoulder 17. The ring blank that cooperates with this modified form of cone comprises a body portion 19ª and a lateral annular extension 20. The body portion undergoes no substantial change of size or shape in the operation of becoming the rib part 19 of the bearing cone. The lateral annular extension 20 is located on the inner face of the body portion and is of substantially the same width as the depth of the counterbore provided to receive it in the end of the bearing cone. The outer periphery of this lateral extension is a substantially cylindrical surface of the same diameter as the outermost diameter of said counterbore; the inner surface of said lateral extension tapers at about the same angle but in an opposite direction to the taper of the counterbore; and the annular face of said lateral extension is inclined at an oblique angle to the outer peripheral surface and is substantially at the same angle thereto that the surface of the counterbore makes with the shoulder that forms the bottom thereof. In assembling the parts constituting this modification, the lateral annular extension of the ring blank is inserted into the counterbore of the bearing cone until the outer peripheral edge thereof contacts with the shoulder forming the bottom of said counterbore. Thereupon the annular extension of said ring blank is expanded to fill the space or spaces between it and the bearing cone so as thereby to interlock them together and convert said ring blank into the rib of said bearing cone. The operation is similar to that above described, except that the annular extension swings outwardly on its inner annular line attachment to the body of the ring blank accompanied by stretching and plastic flow of the metal. A shouldered ram with a tapered body portion whose maximum diameter is substantially equal to the bore of the bearing cone would be a suitable apparatus for performing this operation, the portion of said ram of maximum diameter becoming operative before the shoulder thereof drives the ring blank home against the end of the bearing cone.

What I claim is:

1. The process of producing a roller bearing which comprises forming a hollow inner race member with an integral thrust rib at one end of its raceway and with an annular portion of reduced thickness extending beyond the other end of said raceway and formed with a circumferential groove with an inclined bottom, assembling the rollers and cage with relation to said inner race member, and then mounting a thrust rib at the other end of said raceway by causing a portion of the metal thereof to flow into said groove and interlock therewith.

2. The process of producing a roller bearing which comprises forming a hollow inner race member with an integral thrust rib at one end of its raceway and with an annular portion of reduced thickness extending beyond the other end of said raceway and formed with a circumferential groove with an inclined bottom, assembling the rollers and cage with relation to said inner race member, and then mounting a thrust rib at the other end of said raceway by flattening a dished ring against the shoulder at the end of said raceway and thereby causing a portion of said ring to enter said groove and interlock therewith.

3. The process of producing a roller bearing which comprises forming a hollow inner race member with an integral thrust rib at one end of its raceway and with an annular portion of reduced thickness extending beyond the other end of said raceway and formed with a circumferential groove with an inclined bottom, assembling the rollers and cage with relation to said inner race member, and then mounting a thrust rib at the other end of said raceway by flattening a dished ring against the shoulder at the end of said raceway and thereby causing a portion of said ring to enter said groove and interlock therewith, said ring being thicker than the shoulder at the end of said raceway and having its outer convex edge beveled to coöperate with the ends of the rollers in resisting end thrust.

4. The process of producing a roller bearing which comprises forming a hollow inner race member with an integral thrust rib at one end of its raceway and with an annular portion of reduced thickness extending beyond the other end of said raceway and formed with a circumferential groove with an inclined bottom, assembling the rollers and cage with relation to said inner race member, and then mounting a thrust rib at the other end of said raceway by flattening a dished ring against the shoulder at the end of said raceway and thereby causing a portion of said ring to enter said groove and interlock therewith, said ring having a cylindrical bore of substantially the same diameter as the end diameter of said extension and having the outer edge on the convex side beveled at such angle with relation to said convex side as is required for the angle between the raceway and the bearing surface of the thrust rib formed by said ring.

5. The process of assembling parts of a roller bearing which comprises forming the inner race member with a groove near its end whose bottom tapers inwardly from said end, assembling the rollers and cage with relation to said race, and then pressing onto said end a dished ring with the outer edge of its convex side beveled and with a cylindrical bore of substantially the same diameter as said end until said ring bears flatwise against the bottom and side walls of said groove.

6. A roller bearing comprising inner and outer raceway members, rollers cooperating therewith and a cage for said rollers, one of said raceway members having an undercut annular groove and a solid ring rib having a portion with a conical surface interlocked with and substantially filling said groove.

7. A roller bearing comprising inner and outer raceway members, rollers cooperating therewith and a cage for said rollers, one of said raceway members comprising a body portion having a rib at its larger end and a reduced end portion having a groove whose bottom tapers inwardly, and a solid ring rib interlocked with and substantially filling said groove.

Signed at Canton, Ohio, this 12th day of January, 1925.

TRACY V. BUCKWALTER.